United States Patent
Poon et al.

(10) Patent No.: US 11,023,214 B2
(45) Date of Patent: Jun. 1, 2021

(54) SYSTEM AND METHOD FOR ELIMINATING RUNTIME OUT-OF-BOUNDS ERRORS AND EXCEPTIONS

(71) Applicants: Roger James Poon, Covington, WA (US); Anton Rapetov, Moscow (RU)

(72) Inventors: Roger James Poon, Covington, WA (US); Anton Rapetov, Moscow (RU)

( * ) Notice: Subject to any disclaimer, the term of this patent is extended or adjusted under 35 U.S.C. 154(b) by 0 days.

(21) Appl. No.: 16/524,023

(22) Filed: Jul. 27, 2019

(65) Prior Publication Data

US 2020/0034125 A1    Jan. 30, 2020

Related U.S. Application Data

(60) Provisional application No. 62/712,193, filed on Jul. 30, 2018.

(51) Int. Cl.
*G06F 8/41* (2018.01)
*G06F 11/36* (2006.01)
*G06F 9/455* (2018.01)
*G06F 9/445* (2018.01)

(52) U.S. Cl.
CPC .............. *G06F 8/425* (2013.01); *G06F 8/427* (2013.01); *G06F 8/437* (2013.01); *G06F 9/44589* (2013.01); *G06F 9/45558* (2013.01); *G06F 11/3604* (2013.01)

(58) Field of Classification Search
None
See application file for complete search history.

(56) References Cited

U.S. PATENT DOCUMENTS

| | | | |
|---|---|---|---|
| 7,584,461 B2 * | 9/2009 | Plum | G06F 11/3624 717/143 |
| 7,810,080 B2 * | 10/2010 | Plum | G06F 11/3624 717/140 |
| 9,459,848 B1 * | 10/2016 | Horie | G06F 8/43 |
| 2005/0246693 A1 * | 11/2005 | Plum | G06F 8/41 717/140 |
| 2006/0053131 A1 * | 3/2006 | Meijer | G06F 8/31 |
| 2012/0079465 A1 * | 3/2012 | Harvey | G06F 8/437 717/146 |
| 2013/0104100 A1 * | 4/2013 | Mueller | G06F 9/45512 717/106 |
| 2013/0159967 A1 * | 6/2013 | Jazdzewski | G06F 8/313 717/114 |
| 2014/0201838 A1 * | 7/2014 | Varsanyi | G06F 21/552 726/23 |
| 2016/0259633 A1 * | 9/2016 | Poon | G06F 8/437 |
| 2017/0090874 A1 * | 3/2017 | Blumenau | G06F 9/45512 |

(Continued)

*Primary Examiner* — Jason D Mitchell

(57) ABSTRACT

Embodiments herein disclose systems and methods for enabling new types (referred to as existent types), that allow for expressing additional possible values and, thereby, eliminating out-of-bounds access errors in programming. In addition to the value "null" as supported by many programming languages, embodiments herein introduce a new special or reserved value to represent an out-of-bounds access. In an exemplary embodiment, a special "undefined" value or memory address, which is distinct from "null", that exclusively describes out-of-bounds accesses is defined. The implementation includes but is not limited to value checks, bounds checks, and container-level implementations.

55 Claims, 9 Drawing Sheets

(56) References Cited

U.S. PATENT DOCUMENTS

| | | | |
|---|---|---|---|
| 2017/0316391 A1* | 11/2017 | Peikert | G06Q 20/1235 |
| 2018/0373871 A1* | 12/2018 | Lemay | G06F 21/566 |
| 2020/0026530 A1* | 1/2020 | Rose | G06F 9/547 |
| 2020/0218634 A1* | 7/2020 | Jones | G06N 20/00 |

* cited by examiner

SYSTEM AND METHOD FOR ELIMINATING RUNTIME OUT-OF-BOUNDS ERRORS AND EXCEPTIONS

This application claims the benefit of U.S. Provisional Application No. 62/712,193, filed Jul. 30, 2018.

TECHNICAL FIELD

The embodiments herein relate to enabling new type definitions for eliminating out-of-bounds access errors in programming.

BACKGROUND

A common problem in computer programming is accessing array and other container elements that are "out of bounds." For example, if there are only three (3) elements in an array, trying to access the 1000th element will usually result in a runtime exception or crash. This is the case in almost all of the major programming languages: C, C++, Java, Haskell, and more. Such errors can increase development time for developers and, therefore, increase cost for organizations depending on software for their operations.

One potential solution is dependent typing that encodes values into data types, but it can be impractical because it can potentially make type checking undecidable—with infinite compile times in the worst case.

Therefore, there is a need for a solution that eliminates out of bounds errors that is relatively simple for compilers to implement.

BRIEF DESCRIPTION OF THE FIGURES

The embodiments herein will be better understood from the following detailed description with reference to the drawings, in which.

DETAILED DESCRIPTION OF EMBODIMENTS

Figure 1:
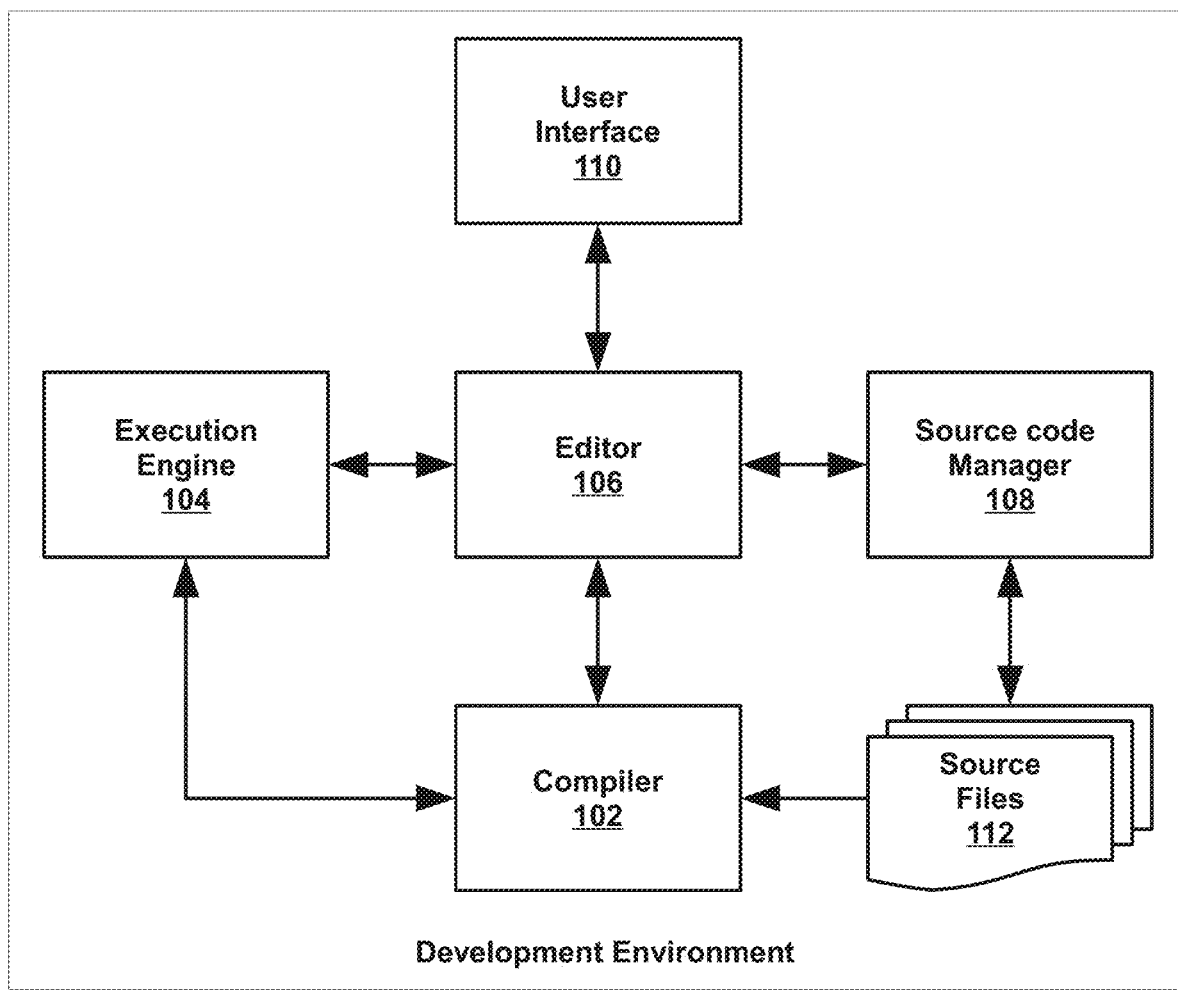
FIG. 1 illustrates an example development environment (DE), according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and methods for enabling new types (referred to as existent types), that allow for expressing additional possible values and, thereby, eliminating out-of-bounds access errors in programming.
Compile Time Vs Runtime "Compile time" refers to the time during which a program is being compiled from a source programming language into a target language, such as a language the machine understands. In contrast, "runtime" refers to the time a program, such as a compiled program, is being executed or run.

Certain properties of a program can be reasoned about during compile time. However, it is difficult to detect out-of-bounds errors at compile time. One reason is due to nondeterministic values that cannot be predicted such as user input, random numbers, timestamps, etc.

Compile-time analysis is further complicated by the Halting Problem. The Halting Problem is the problem of determining whether a computer program will complete execution (halt) or continue to run forever. Alan Turing proved in 1936 that a general algorithm to solve the Halting Problem for all possible programs and inputs cannot exist.

The Halting Problem is itself a subset of a more general user experience (UX) problem in compiler engineering: compile times. Slow compile times slow down programmer and team productivity, increase project costs, and cause general frustration for the programmer. Therefore, there is a need for a fast method to prevent out-of-bounds errors at compile time; thus, preventing unexpected program termination and security issues at runtime.
Permutations Compile time analysis of out-of-bounds errors is complicated when introducing map, dictionary, associative array, or key-value pair data structures.

Consider a key-value pair data structure where the key is a string. If the string is dependent on a non-deterministic value, such as a timestamp or user input, it becomes impossible for the compiler to determine the keys at compile time because the keys can be different on each run of the application.

Thus, there exists infinitely-many possible permutations. As a consequence, the compiler will be unable to determine—on a key access—whether the key being accessed exists (within-bounds access) or does not exist (out-of-bounds access).
Exceptions Since the whole program cannot be fully analyzed at compile time, the aspects of a program that can be analyzed at compile time, such as a program's data types, must be correct.

Since out-of-bounds accesses and errors cannot be detected at compile time in the current state of the art, the conventional method is to throw exceptions at runtime in order to preserve the correctness of the static data types that are analyzed at compile time.

For example, if a pointer is declared to point to a null-terminated string, an out-of-bounds access may result in an access to a memory location that is not related to the null-terminated string. This error can currently only be detected at runtime and will invalidate the compile time analysis assumptions, resulting in an incorrect analysis.

Instead, by throwing exceptions at runtime, the compile-time assumptions can be made correct. Compilers generally handle this by generating bounds checking code for runtime execution. If the bounds check fails at runtime, an exception is thrown. Consequently, incorrect values do not get assigned; thus, data types are correctly preserved.

However, an unhandled exception will result in premature program termination. Furthermore, depending on the programming language semantics, exceptions can incur performance penalties.

Nullable Types

Some programming libraries use "nullable types" to represent a potential out-of-bounds access to avoid throwing exceptions. While this may occur in individual libraries, it should be noted that it is rare for programming languages to describe out-of-bounds accesses via nullable types at the language level, due to flaws in reasoning and semantics, as will be explained hereafter. Nullable types, as used in many programming languages like C# and JAVA today, enable describing data that includes all of the possible values for the underlying data type plus 'null'.

For example, consider a 'File' class. For a new file that was just created, it would be inaccurate to describe the "last access time" as any value other than 'null' unless it was both created and opened at least once. Thus, the class might look something like this:

```
class File
{
  string path;
  Timestamp creationTime;
  Timestamp? lastAccessTime;
}
```

In the above code, 'lastAccessTime' can be of type 'Timestamp' or 'null'. However, 'creationTime' can only be of type 'Timestamp' but not including 'null'. Also, files always have a 'path' that describe their location, so this value is also not able to be 'null'.

Nullable types allow us to more accurately describe data with types. Furthermore, if data types are non-nullable by default, nullable types solve the 'NullPointerException' problem that plagued Java, provided there are language constructs that allow a programmer to explicitly check for or safely convert from a nullable type to a non-nullable type.

Initially, it may appear that the "null" value can also be used to represent an out-of-bounds access; for example:

```
int[ ] arr = [ 1, 2, 3 ];
int? x = arr[0];
int? y = arr[1000];
assert(null != x); // 'x' is within bounds
assert(null == y); // 'y' is out of bounds
```

However, this assumption is incorrect. Revisiting the example where a file's last access times can be nullable, if we try to declare an array of last access times, we have the following code:

```
Timestamp?[ ] lastAccessTimes = [ file1.lastAccessTime,
file2.lastAccessTime ];
Timestamp? first = lastAccessTimes[0]; // null
Timestamp? thousandth = lastAccessTimes[1000]; // null
```

As illustrated in the code above, the variable "first" (attempting a within-bounds access at index 0, assuming zero-based indexes) can be assigned a value of "null". However, the variable "thousandth" (attempting an out-of-bounds access at index 1000) will also be assigned a value of "null".

Furthermore, there is a user experience (UX) pitfall with nullable types. Consider an increment operation in a C-like programming language:

```
int[ ] arr = [ 1, 2, 3 ];
for (int i = 0; i < arr.length; ++i) {
  arr[i + 1]++;
}
```

In the above code, the increment (++) operation is potentially unsafe because it may be attempting an increment operation on an out-of-bounds access. However, a basic loop plus increment is a common occurrence in computer programming. If a user is forced to make the operation safe (such as with conditional branches), it increases code complexity, makes the code harder to analyze (both for static analyzers and humans), and—most importantly—makes the language harder to sell in a world that's moving increasingly to terser programming languages, and languages that fail to gain momentum and traction may never be able to achieve usage.

Default Initialization

In order to address the shortcomings of the preceding efforts, some programming languages, such as C++, have default initialization semantics for out-of-bounds accesses.

As an example, in the C++ STL, std::unordered_map overloads operator [ ]. The operator returns a reference to the value that is mapped to the key and performs an insertion if the key does not exist (e.g. an out-of-bounds access occurred).

However, default initialization can be dangerous in some cases. Consider the following C++ code:

```
#include <iostream>
#include <string>
#include <unordered_map>
int main( ) {
  std::unordered_map<std::string, int> config;
  std::cout << config["timeout"] << std::endl;
  return 0;
}
```

In C++, the "int" data type is "default constructible" and defaults to zero (0). However, as illustrated in the code above, not all zero values are created equal. Accidentally setting a price or timeout value to zero can have disastrous consequences as opposed to accidentally setting an X or Y coordinate value to zero.

Existent Types

In addition to the special value "null", embodiments herein introduce a new special or reserved value to represent an out-of-bounds access. For example, an embodiment can introduce a special "undefined" value or memory address, which is distinct from "null", that exclusively describes out-of-bounds accesses. In addition, an embodiment can choose to introduce a special "undefined" value or memory address to describe all non-existent data, including out-of-bounds accesses.

An ordinarily skilled person in the art will appreciate the fact that the term "undefined" can easily be replaced with other alternatives without deviating from the spirit and scope of the embodiments herein. For example, it is possible to define language keywords such as "out_of_bounds" or "OutOfBounnds" to indicate a value that represents non-existent data in the context of out-of-bounds access. Such modifications do not deviate from the spirit and scope of the invention described herein.

Oftentimes, in computer programming, we want to express that a value is defined but the defined value is 'null' (as in the file "last access time" example described earlier). However, there are times when we want to describe another concept: that there is no value defined; in fact, a value doesn't exist at all. This value can be referred to as "undefined." This is the basis for existent types.

Existent types allow a programmer to express that the data he/she is attempting to access might not exist at all. Therefore, an existent type can be used to describe data for a type to include all possible values for the type plus an "undefined" value.

By having value semantics, instead of exception semantics or buffer overflow semantics, existent types lead to memory safety and protection from premature or unexpected application termination.

Referring now to the drawings, and more particularly to FIGS. 1 through 9, where similar reference characters denote corresponding features consistently throughout the figures, there are shown embodiments.

FIG. 1 illustrates an example development environment (DE). The DE may reside partially and completely on one or more computers such as the one illustrated in FIG. 9.

In an example embodiment, the DE may be part of an Integrated Development Environment (IDE) used by programmers for development. In other embodiments, the DE may also be enabled as a plugin in other IDEs such as ECLIPSE.

The DE includes a compiler to compile programming language(s) with existent types and other standard DE modules such as a user interface 110 for rendering visual interface for editing code and managing code, an editor 106 for allowing programmers to edit source code, an execution engine 104 for runtime execution of compiled code, a source code manager 108 to enable programmers to manage source code files, and a source files module 112 to store and retrieve source files.

Figure 2:
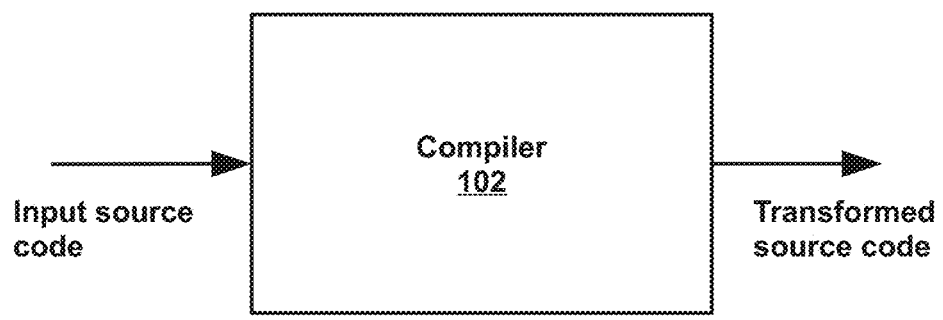
FIG. 2 illustrates a high-level process where the compiler 102 compiles input source code to transform the code for machine execution, according to an embodiment herein.

FIG. 2 illustrates a high-level process where the compiler 102 compiles input source code to transform the code for machine execution.

In the context of this invention, the term compilation may include one or more of the commonly known processes of compilation, interpretation and translation as is required for various platforms. An ordinarily skilled person will be able to apply the information provided herein to apply to his/her programming language and development environment.

The compiler 102 identifies existent types in the input source code and transforms them to appropriate form as discussed in this specification to avoid out-of-bound errors.

The use of existent type and the process of compilation is explained further in detail in the following sections.

Existent Type Declaration Syntax

For explanatory purposes, the following non-limiting syntax can be used to describe relevant data types:
1. Foo=includes all data of type 'Foo'
2. Foo+=includes all data of type 'Foo' plus 'undefined'
3. Foo?=includes all data of type 'Foo' plus 'null'
4. Foo?+=includes all data of type 'Foo'+'null'+'undefined'

From the aforementioned examples, it is apparent that existent types allow us distinguish data that is defined but is an empty/missing/uninitialized value (referred to as 'null') from data that does not exist at all (referred to as 'undefined').

Furthermore, existent types can be combined with nullable types, which fully enable a user to express that a value can be defined but empty/uninitialized (e.g. a file's last access time) or a value that does not exist at all (an "out-of-bounds" access). This is a key concept: an out-of-bounds access represents a value that does not exist at all and is expressed with existent types.

The following illustrates declaring array types as is conventional today:

```
int x=1;

int[ ] foo=[1,2,3];
```

In the above code, a variable named 'x' with the type 'int' is declared. However, in order to declare an array type, one must include '[ ]' in the type annotation (in this case, we have data of type 'int[ ]'). Thus, an array is declared with an element type of 'int'. After the '±' sign, the array is initialized to three elements: 1, 2, and 3.

The following illustrates the way array types can be combined with other types:
1. Foo=includes all data of type 'Foo'
2. Foo[ ]=an array with elements of type 'Foo'
3. Foo?[ ]=an array with elements of type 'Foo' or 'null'. Here, the array itself cannot be null but the elements can.
4. Foo[ ]?=an array of type 'Foo' or 'null'. Here, the array itself can be 'null' but the elements cannot.
5. Foo?[ ]?=Both the array and its elements can be 'null'.

Figure 3:
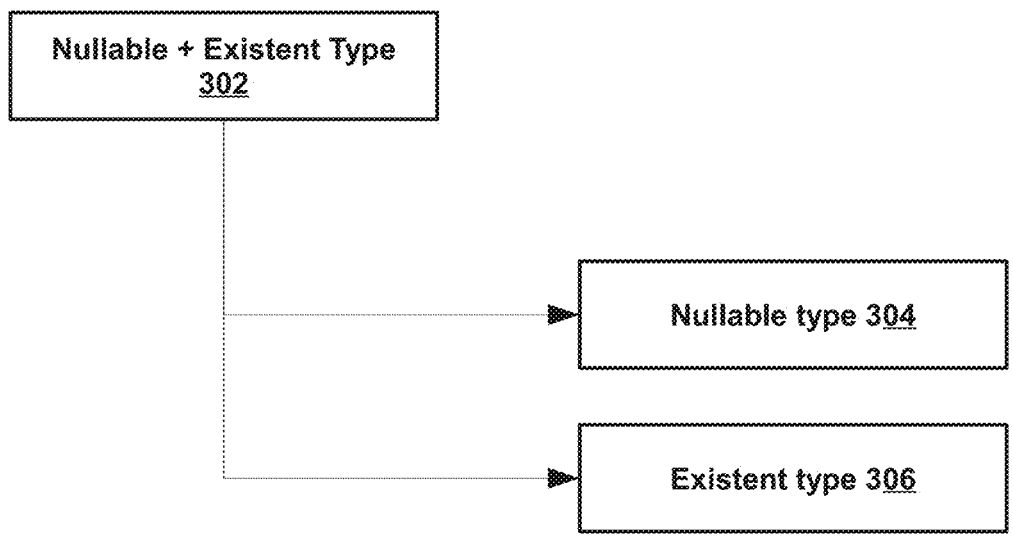
FIG. 3 illustrates type hierarchy, according to an embodiment herein.

The type that allows for both nullable and undefined values is referred to as Nullable+Existent type 302. The Nullable+Existent type 302 is a supertype of both nullable type 304 and existent type 306, as illustrated in FIG. 3.

The Nullable+Existent type enables programmers to express an underlying value (of the underlying type), an existing but empty value ('null'), or a non-existent value ('undefined'). Consider the following example:

```
import System;
Dictionary<bool?> inviteeDecisions = {
  "Roger": true,
  "Anton": true,
  "James": null, // James is undecided
  "Qin": false
};
bool?+ isJamesAttending = inviteeDecisions["James"]; // 'null'
bool?+ isBryceAttending = inviteeDecisions["Bryce"]; // 'undefined'
```

In the example program above, we use a software program to keep track of invitees to a party. If the invitee's decision is "true", he is attending. If the invitee's decision is "false", he is not attending. If the invitee's decision is "null", he is undecided. Finally, if the invitee's decision is "undefined", he was never invited.

Thus, in the example program, the "Dictionary" container represents key-value pairs, where the keys are strings, and—as given in the generic type argument in the example—the values are nullable Booleans. "Roger" and "Anton" are attending the party, "James" is undecided", and "Qin" will not be attending.

In the variable declarations, "isJamesAttending" and "isBryceAttending", the example uses the Nullable+Existent type. When querying whether "James" is attending the party, we get the correct value: "null" ("James" is undecided). However, when we query whether "Bryce"—who was never invited and not present in the "inviteeDecisions" dictionary data structure—we get "undefined". In other words, there is no value corresponding to the string key, "Bryce", and we thus get an out-of-bounds access resulting in the "undefined" value.

By enabling nullable types to be combined with existent types via the Nullable+Existent type, an embodiment can have the flexibility of describing values that can be either existing but empty ("null") or non-existent/out-of-bounds ("undefined").

Compilation

Figure 4:
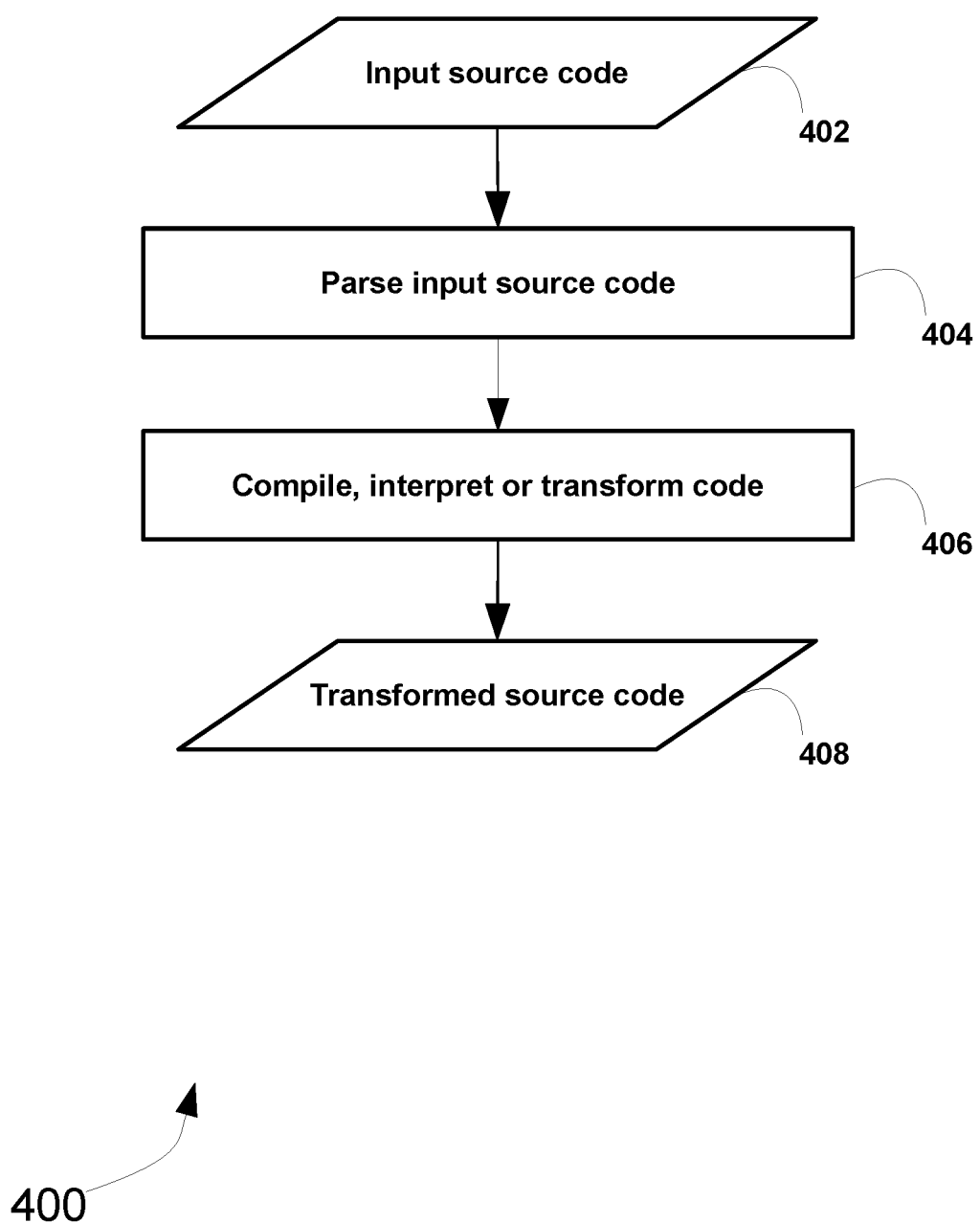
FIG. 4 is a flow chart illustrating the process followed by the compiler 102, according to an embodiment herein.

FIG. 4 is a flow chart illustrating the process followed by the compiler 102. As part of compilation, compiler 102 receives (402) input source code based on user action through the development environment as illustrated in FIG. 1. The compiler parses (404) the input source code to generate parse tree. Further, the generated parse tree is compiled (406) to generate output, which may be in the form of transformed source code (408).

In one example embodiment, existent types can be supported in a programming language like JAVA and a compiler can be adapted to compile JAVA source code with existent types to generate JAVA byte code. The process of compiling may involve transforming the JAVA source with existent types to JAVA source without existent types using relevant code translation. Further, the JAVA source without existent types can be compiled to JAVA byte code as is normally performed by a JAVA compiler.

In the context of programming languages that are transpiled (translated from one high-level language to another high-level language), the transformed code can be code in the language without any existent types where existent types are converted to equivalent form without the use of existent types. In another case, when the target language has no concept of existent types, a value from the target language can be reserved to represent the existent type "undefined" value.

In various embodiments, the transformed source can be one of a translated code without existent types, byte code that can be interpreted by a virtual machine, an intermediate representation, and native machine level instruction code.

The various actions in method 400 may be performed in the order presented, in a different order or simultaneously. Further, in some embodiments, some actions listed in FIG. 4 may be omitted.

Figure 5:
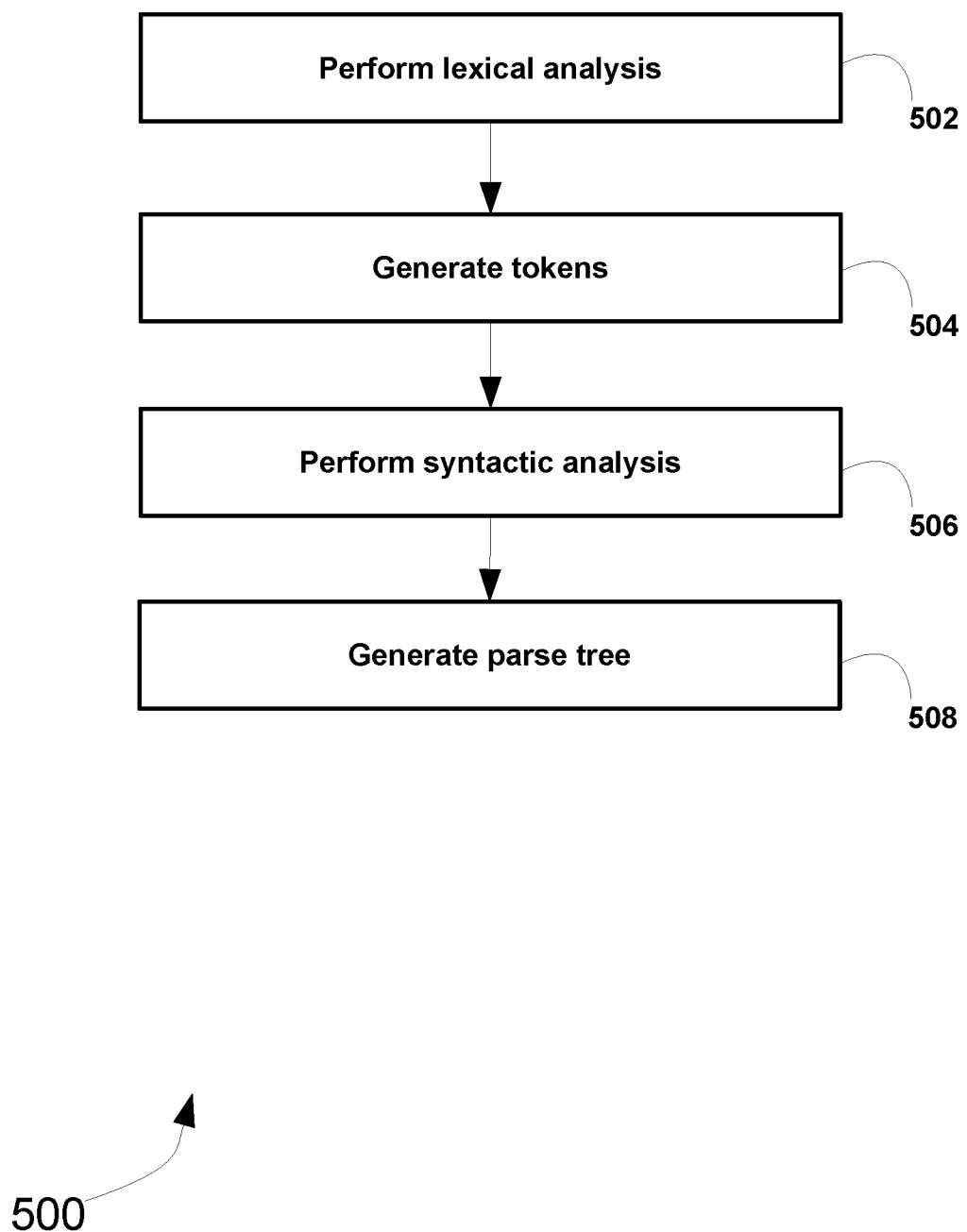
FIG. 5 is a flow chart illustrating the process of parsing from step 404 in FIG. 4 in further detail, according to an embodiment herein.

FIG. 5 is a flow chart illustrating the process of parsing from step 404 in FIG. 4 in further detail. Parsing involves performing (502) lexical analysis and generating (504) tokens to be able to build parse tree. The tokens are analyzed (506) for syntax (also referred to as "syntactical analysis") before generating (508) parse tree.

In various embodiments, the parser has an internal representation of all "base types." As a non-limiting example, the "base types" might include primitive types ('int', 'bool', 'unsigned int', etc.) and user-defined types (represented with identifiers or combinations of identifiers, such as 'Foo', 'Foo.Bar', 'Array', 'Dictionary', 'Map', etc.).

Syntactical analysis involves using various rules for enforcing proper syntax. A non-exhaustive set of rules are provided hereunder which can be used to prevent existent types being the element type of arrays or other containers:

1. If a base type precedes the existent type syntax, the parser continues to generate the Abstract Syntax Tree (AST).
2. If a base type precedes an array type syntax, which precedes the existent type syntax, the parser continues to generate the Abstract Syntax Tree (AST).
3. If a base type precedes an existent type syntax, which precedes an array type or container type syntax, the parser performs one of the following actions (which can be combined or used individually):
   a. Terminate parsing.
   b. Generate an error and immediately reports to the user.
   c. Insert an error node into the AST.
   d. Generate an error which can be reported later (e.g. during semantic analysis stage).
4. If a base type precedes a nullable type syntax, which precedes the existent type syntax, the parser continues to generate the AST.
   a. Where the type annotation generated in the AST can be a "supertype" that represents the base type+null+undefined.
5. If a base type precedes the existent type syntax, which precedes a nullable type syntax, the parser continues to generate the AST.
   a. Where the type annotation generated in the AST can be a "supertype" that represents the base type+null+undefined.
6. If a base type precedes a nullable type syntax, which precedes the existent type syntax, which precedes an array type or container type syntax, the parser performs one of the following actions (which can be combined or used individually):
   a. Terminate parsing.
   b. Generate an error and immediately reports to the user.
   c. Insert an error node into the AST.
   d. Generate an error which can be reported later (e.g. during semantic analysis stage).
7. If a base type precedes the existent type syntax, which precedes a nullable type syntax, which precedes an array type or container type syntax, the parser performs one of the following actions (which can be combined or used individually):
   a. Terminate parsing.
   b. Generate an error and immediately reports to the user.
   c. Insert an error node into the AST.
   d. Generate an error which can be reported later (e.g. during semantic analysis stage).
8. If a base type precedes an array type or container type syntax, which precedes the existent type syntax, which precedes an array type or container type syntax, the parser performs one of the following actions (which can be combined or used individually):
   a. Terminate parsing.
   b. Generate an error and immediately reports to the user.
   c. Insert an error node into the AST.
   d. Generate an error which can be reported later (e.g. during semantic analysis stage).
9. If a base type precedes an array type or container type syntax, which precedes a nullable+existent type syntax (or the existent type+nullable syntax), which precedes an array type or container type syntax, the parser performs one of the following actions (which can be combined or used individually):
a. Terminate parsing.
b. Generate an error and immediately reports to the user.
c. Insert an error node into the AST.
d. Generate an error which can be reported later (e.g. during semantic analysis stage).
10. If a type argument (e.g. in parametric polymorphism) is an existent type, the parser performs one of the following actions (which can be combined or used individually):
a. Terminate parsing.
b. Generate an error and immediately reports to the user.
c. Insert an error node into the AST.
d. Generate an error which can be reported later (e.g. during semantic analysis stage).
11. If a type argument (e.g. in parametric polymorphism) is a nullable+existent type, the parser performs one of the following actions (which can be combined or used individually):
a. Terminate parsing.
b. Generate an error and immediately reports to the user.
c. Insert an error node into the AST.
d. Generate an error which can be reported later (e.g. during semantic analysis stage).

The various actions in method 500 may be performed in the order presented, in a different order or simultaneously. Further, in some embodiments, some actions listed in FIG. 5 may be omitted.

Figure 6:
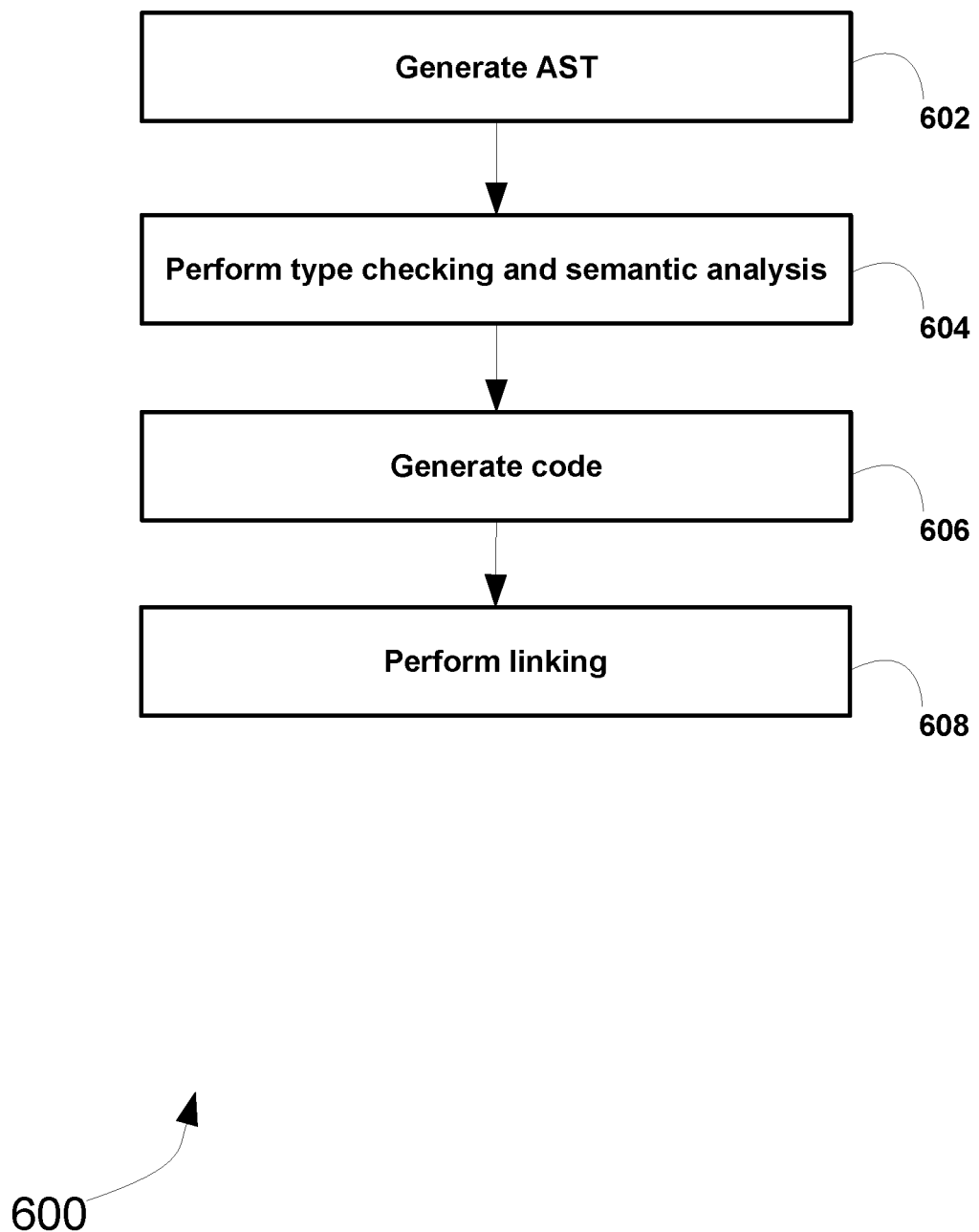
FIG. 6 is a flow chart illustrating the process of compilation from step 406 in FIG. 4 in further detail, according to an embodiment herein.

FIG. 6 is a flow chart illustrating the process of compilation from step 406 in FIG. 4 in further detail.

Compilation process involves generating (602) AST from the parse tree generated by the parsing process. Further, type checking and semantic analysis are performed (604) using the AST.

Besides common type checking operations, type checking (from step 604) also involves the following non-exhaustive list of rules:
1. The type for an index operation or other container element access, irrespective of the level of nesting, evaluates to an existent type. The nesting can also involve containers of different types (such as an array inside a map).
2. An operation where an operand is an existent type evaluates the operation's type to an existent type. The operation can include but is not limited to an increment operation, a decrement operation, or a compound assignment operation.
3. Data that evaluates to an existent type and has a primitive type as the existent type's underlying type can be explicitly converted to the primitive type (such as via type casting expressions).
4. Data that evaluates to an existent type and has a primitive type as the existent type's underlying type can be implicitly converted to the primitive type (such as via implicit type conversion rules built into the type checker).

Subsequently, code is generated (606) to be able to execute on a machine. The code generated can be optionally linked (608) to be able to interpret and/or execute the code.

Code generation can involve one or more steps from the following non-exhaustive list (not specified in any particular order):
1. When compiling container access code, the compiler generates a conditional (such as a conditional jump or a ternary operation). In the generated conditional, if the access is within bounds, the code generator generates code that returns the relevant data; if the access is out-of-bounds, the code generator generates code that returns data representing the 'undefined' value or an out-of-bounds value.
2. When compiling code with existent types, the code generator can generate a special 'undefined' value or class that is different from a 'null' value and other values.
3. When compiling code with jagged arrays or nested containers, code generator generates code to check each level of nesting for 'undefined' or an out-of-bounds access (such as via bounds checking, container size checking, element presence checking, etc.) The "nested containers" can include nesting different types of containers (such as an array inside a map).
4. When compiling code with expressions where an operand is an existent type, code generator can generate code such that:
a. The data described by the existent type can be checked for an out-of-bounds access. If the data is within bounds, the code can be generated such that the operation can execute under this condition. Code can optionally be generated so that if the data is out-of-bounds, nothing further is done or the 'undefined' (out-of-bounds) value or equivalent value is returned.
b. The data described by the existent type can be checked for a value representing 'undefined' or out-of-bounds access. If the data is not 'undefined' or a value representing out-of-bounds access, the code can be generated such that the operation can execute under this condition. Code can optionally be generated so that if the data is out-of-bounds, nothing further is done or the 'undefined' (out-of-bounds) value or equivalent value is returned.
5. When compiling code with data that has a type with a default value as an existent type's underlying type, code generator can generate code that checks if the value is within bounds, if the value is within bounds the requested data is returned, and if the value is out of bounds the default value for the underlying type is returned.
6. When compiling code where JavaScript is the target language, container accesses do not need to generate bounds checking code since this is handled by the target language's semantics.
7. When compiling code where the LHS (left-hand side) of a null assignment operator (e.g. JS++'s ?=) is an existent type, the code generated can check for 'undefined' or an out-of-bounds access. In an alternate embodiment, code generated can additionally check for 'null'.
8. When compiling code where the LHS (left-hand side) of a null coalescing operator (e.g. C#'s ??) is an existent type, the code generated can check for 'undefined' or an out-of-bounds access. In an alternate embodiment, the code generated can additionally check for 'null'.
9. When compiling code where the 'object' of a safe navigation operator is an existent type, the code generated can check for 'undefined' or an out-of-bounds access. In an alternate embodiment, the code generated can additionally check for 'null'.

The various actions in method 600 may be performed in the order presented, in a different order or simultaneously. Further, in some embodiments, some actions listed in FIG. 6 may be omitted.

Figure 7:
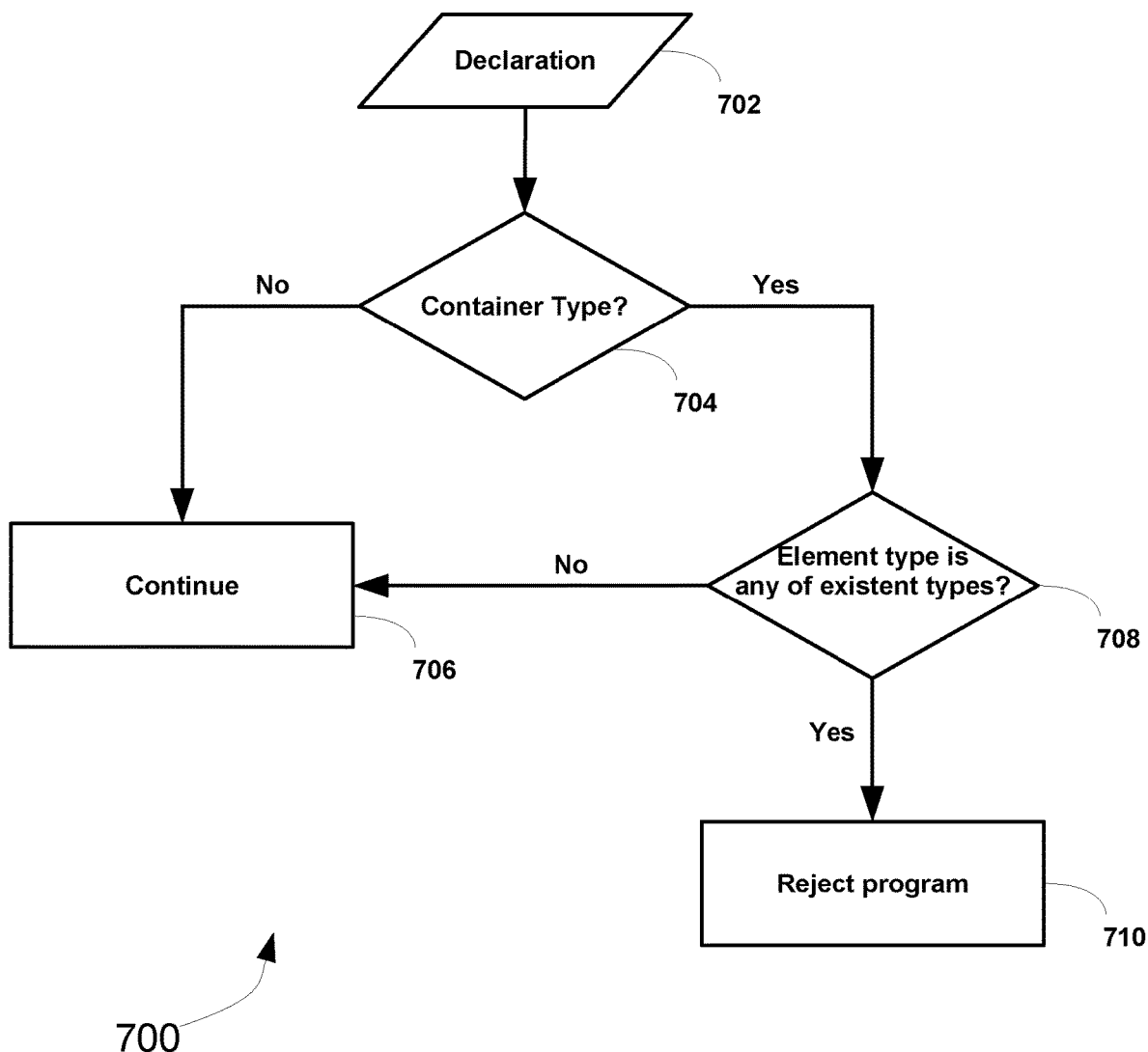
FIG. 7 is a flow chart illustrating the type checking process for array types, according to an embodiment herein.

FIG. 7 is a flow chart illustrating the type checking process for array and container type declarations (702). The process 700 involves checking (704) if a given type annotation (702) being evaluated has an array or container type. If the type being evaluated is not an array or container type, process may continue (706) according to conventionally known type checking process. If the type being evaluated is of an array or container type, the type of elements of the array or container is evaluated (708). If the element type is found to be an existent type, then the program is rejected (710). If the element type is not an existent type, the regular type checking process continues (706).

The various actions in method 700 may be performed in the order presented, in a different order or simultaneously. Further, in some embodiments, some actions listed in FIG. 7 may be omitted or performed outside the type checker.

Figure 8:
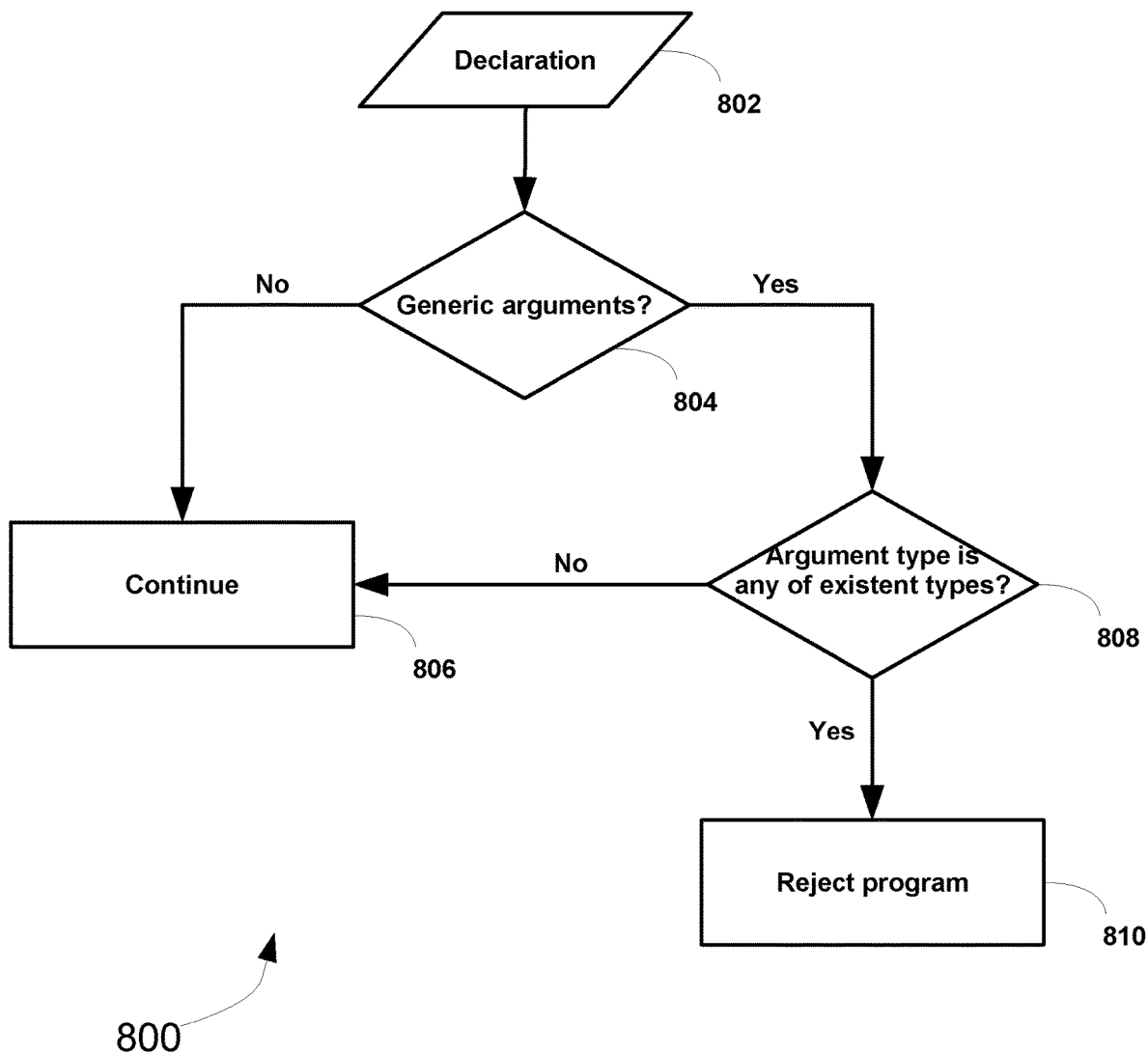
FIG. 8 is a flow chart illustrating the type checking process for generic types, according to an embodiment herein.

FIG. 8 is a flow chart illustrating the type checking process for generic types. The process 800 involves checking (804) if a given expression or type annotation (802) being evaluated has a type with generic argument. If the type being evaluated does not involve a generic argument (type parameter), process may continue (806) according to conventionally known type checking processes. If the type being evaluated involves a generic argument, the type of generic argument is evaluated (808). If the generic argument type is found to be an existent type, then the program is rejected (810). If the generic argument type is not an existent type, the regular type checking process continues (806).

The various actions in method 800 may be performed in the order presented, in a different order or simultaneously. Further, in some embodiments, some actions listed in FIG. 8 may be omitted.

Example Implementation: Existent Type Restrictions

In a preferred embodiment, a goal is to prevent the programmer from expressing data as "it exists, but the value is 'undefined'." If such a restriction is not placed, 'undefined' can represent a within-bounds and out-of-bounds value, which has no meaning. Instead, the compiler can enforce and ensure that a within-bounds array or container element can never have a value of 'undefined' or any such value that represents an out-of-bounds access.

Therefore, to use the syntax described in FIGS. 1 and 2, we can describe the following rules for allowed types:

TABLE 1

| Type | Accept/Reject |
| --- | --- |
| int | Accept |
| int+ | Accept |
| int? | Accept |
| int?+ | Accept |
| int[ ] | Accept |
| int?[ ] | Accept |
| int+[ ] | Reject |
| int[ ]? | Accept |
| int[ ]+ | Accept |
| int[ ]?+ | Accept |
| int?[ ]? | Accept |
| int?[ ]+ | Accept |
| int+[ ]? | Reject |
| int+[ ]+ | Reject |
| int?+[ ] | Reject |
| int[ ]?+ | Accept |
| int[ ][ ] | Accept |
| int[ ]?[ ] | Accept |
| int[ ]+[ ] | Reject |
| int[ ]?+[ ] | Reject |
| int[ ][ ]?+ | Accept |
| int[ ][ ]+ | Accept |
| Array<int> | Accept |

TABLE 1-continued

| Type | Accept/Reject |
| --- | --- |
| Array<int?> | Accept |
| Array<int+> | Reject |
| Array<int?+> | Reject |
| Stack<int> | Accept |
| Stack<int?> | Accept |
| Stack<int+> | Reject |
| Stack<int?+> | Reject |

The rules in Table 1, can all be described by one simple rule: an existent type cannot be the underlying element type of an array or other container.

Note that the rules in Table 1 describe the types that users can declare. For example, the user can declare a variable with the int?[ ] type (an array of nullable 'int' elements):

int?[ ] arr=[1,2,null,3];

However, the user cannot declare a variable with the int+[ ] type:

int+[ ] arr=[1,2,3];//ERROR

By preventing arrays and other containers (such as a stack, queue, or map) from being declared as having elements with an existent type, an embodiment can provide meaningful semantics to existent types. For example, if "undefined" only describes out-of-bounds accesses in an embodiment, preventing arrays and other containers from being declared as having elements with an existent type means you cannot have an "undefined" value inside an array or other container; thus, an embodiment prevents the "undefined" value from meaning both "within bounds" and "out of bounds" simultaneously. Such a restriction can narrow the meaning of "undefined" to only "out of bounds" in an embodiment.

Furthermore, you may have noticed in Table 1 that existent types cannot be used as the type argument where type parameters can be expected, such as in the case of generic programming ("parametric polymorphism"). In some languages, values may be "auto-boxed;" for example, in Java, the 'char' data type is auto-boxed by the 'Character' wrapper class. In such languages, it becomes possible that arrays and other containers can also be auto-boxed, and the wrapper class can be implemented as a generic class that takes one type parameter: the type of the container elements.

Therefore, it is important to restrict type arguments passed to generic classes so that existent types cannot be passed or used. Implementation-wise, an error may be generated, compilation may halt, or code may not be generated.

Example Implementation: Accessing Array Elements

In an example embodiment, variables can be declared with existent types as follows:

int[ ] arr = [ 1, 2, 3 ];
int+ x = arr[0];
int+ y = arr[1000];

While embodiments herein eliminate out-of-bounds exceptions and crashes, they do not eliminate bounds checking. Therefore, the above code may be compiled with a bounds check. The following is example pseudo-code to illustrate the concept and the generated code:

```
int[ ] arr = [ 1, 2, 3 ];
int+ x = 0 < arr.length ? arr[0] : undefined;
int+ y = 1000 <arr.length ? arr[1000] : undefined;
```

In the generated code above, it may be clear that the variable 'x' has two possible values: arr[0] or 'undefined'. The variable 'y' has two possible values: arr[1000] or 'undefined'. The generated code above is a non-limiting example and uses zero-based indexes. There may be various other ways of generating code with equivalent effect.

The ternary conditional operator (?:) is used to perform a bounds check. The bounds check is in the generated code, so it is performed at runtime (during application execution). For variable 'x', it can be checked that the array, 'arr', has at least zero (0) elements before the value at index 0 (the first element) is returned and assigned to variable 'x'. The same can be done for variable 'y'.

The generated code above is a non-limiting example. For example, 'arr.length' (which calculates the number of elements in the array) can be cached to avoid executing the operation twice. In some implementations, an additional condition may be generated to check that the attempted index access is non-negative. In other implementations, the equivalent code will be generated for an intermediate representation, machine code, or assembly code.

Another example of generated code is as follows:

```
int[ ] arr = [ 1, 2, 3 ];
int+ x = arr[0] != undefined ? arr[0] : undefined;
int+ y = arr[1000] != undefined ? arr[1000] : undefined;
```

In this example, arrays may define all index access operations (using the '[ . . . ]' operator) to either return the element itself or 'undefined'. Thus, the runtime check is changed from a bound check to a value check for 'undefined'.

Example Implementation: Container-Level Implementation

While the examples thus far have generated bounds checks or value checks at the expression level (on container accesses), an embodiment can also choose to implement bounds checking or value checking at the container level. In such embodiments, the compiler or code generator does not need to generate bounds checks or value checks (such as checking for the "undefined" value) on each container access.

For example, when code attempts to access an array element at the index zero (0), the compiler may not need to generate additional code, such as conditionals. The reason is because the conditionals for bounds or value checking is implemented at the level of the container class, such as an "Array<T>" wrapper class.

As a non-limiting example, an "Array<T>" wrapper class can implement operator [ ] as returning an existent type (T+) and checking if the index being accessed is within bounds. If the index being accessed is within bounds, the operator [ ]method will return the value at the index; if the index being accessed is out of bounds, the operator [ ] method will return the "undefined" value (or equivalent value).

In various embodiments, container level checks can be performed for both concrete (for example, classes in JAVA) and abstract (for example, interfaces and abstract classes in JAVA) types.

Furthermore, in some embodiments, the compiler can assume—without verifying—that operator [ ] will return a value having an existent type (thus, either a value of a type T or "undefined").

Example Implementation: Arrays of Arrays

Jagged arrays ("arrays of arrays") can be safely handled. Specifically, the type checker returns an existent type on an array index operation or other container element access (such as trying to access a dictionary/map key). Thus:

```
Foo?[ ][ ] arr = [[ null , new Foo( ) ]];
Foo?+ foo = arr[100][0];
Console.log(foo); // undefined
```

By way of non-limiting example, the generated code using the bounds checking method might look like:

```
Foo?[ ][ ] arr = [[ null , new Foo( ) ]];
var tmp = 100 < arr.length ? arr[100] : undefined;
Foo?+ foo = tmp1 !== undefined ? tmp1[0] : undefined;
Console.log(foo); // undefined
```

The expression is "de-composed" for readability. Using the value checking method:

```
Foo?[ ][ ] arr = [[ null , new Foo( ) ]];
var tmp1 = arr[100] !== undefined ? tmp = arr[100] :
tmp = undefined;
Foo?+ foo = tmp1 !== undefined ? tmp1[0] : undefined;
Console.log(foo); // undefined
```

The above describes code generation for jagged arrays, where the code generator will handle each level of nesting. From the perspective of the type checker, the type for an index operation or other container element access, irrespective of the level of nesting, evaluates to the existent type. From the perspective of the code generator, each level of nesting can be individually handled.

Example Implementation: Expression Operators

In a preferred embodiment, a variable of type 'Foo+' (existent type with 'Foo' as the underlying type) cannot be assigned to a variable of type 'Foo'. The system will generate an error in this case.

```
class Foo { }
Foo[ ] arr = [ new Foo( ), new Foo( ) ];
Foo+ foo1 = arr[1000];
Foo foo2 = foo1; // ERROR
```

Considering the foregoing example code, data of 'Foo+' can be 'undefined' while data of type 'Foo' cannot. Thus, when the type checker detects this, it can generate a compile-time type error.

In order to safely enable transfer of data, embodiments herein expand the definition of common "null operators" to further operate on 'undefined' data when existent types are present:

1. ?=
2. ??
3. ?.

The first operator is the "null assignment operator," which will be expanded to include "undefined". This operator will inspect the identifier for a variable on the left-hand side (LHS) to determine if its value is 'undefined' or out of bounds (and, optionally, 'null' too). If the variable described in the LHS is 'undefined' or out of bounds (or, optionally, 'null' too), the variable will be assigned the value on the right-hand side (RHS). The following is an example:

int+x=1;

int+y=undefined;

x?=2;

y?=3;

If the above code is executed, 'x' will retain its value of 1 but 'y' will have the value of 3.

The second operator is the "null-coalescing operator," which will be expanded to include "undefined". This operator inspects the LHS value. If the LHS value is not 'undefined' or out of bounds (and, optionally, 'null' too), the LHS value is returned for the expression. If the LHS value is 'undefined' or out of bounds (or, optionally, 'null' too), the RHS value is returned for the expression. The following is an example:

int+a=1;

int+b=undefined;

int c=a??100;

int d=b??100;

If the above code is executed, 'c' will have a value of 1 and 'b' will have a value of 100.

The third and final operator is the null-conditional operator (also known as the safe-navigation operator), which will be expanded to include "undefined". We commonly need to navigate data like so:

string authorFirstName=book.author.firstName;

However, the code above can be unsafe if the value of 'book' or 'book.author' are "undefined" or out of bounds (or, optionally, "null" too). Thus, the safe navigation operator can be used instead:

string+authorFirstName=book?.author?.firstName;

The safe navigation operator will return 'undefined' if its left-side is 'undefined' or out of bounds (in the above code, 'book' in the 'book.author' expression and 'book.author' in the 'book.author.firstName' expression); otherwise, it returns the requested value. In some embodiments, "null" is also checked for on the left side.

Effectively, the null operators can be used for:
1. Nullable Types (? syntax)
2. Existent Types (+syntax)
3. Nullable+Existent Types (?+ or +? syntax)

Example pseudo-code is described below as examples of code generation for each operator.

?=(null assignment)

```
int[ ] arr = [ 1, 2, 3 ];
int+ value = arr[0];
value ?= 100;
// can mean:
int[ ] arr = [ 1, 2, 3 ];
int+ value = arr[0];
value = (undefined != value) ? value : 100;
```

?? (null coalescing)

```
int value = arr[0] ?? 0;
// can mean:
int value = (undefined != arr[0]) ? arr[0] : 0;
```

?. (null conditional)

```
int+ value = obj?.prop;
// can mean:
int+ value = (undefined != obj) ? obj.prop : undefined;
```

In a preferred embodiment, the values are checked at the expression level because asynchronous code, closures, and so on can modify data such that flow-sensitive type checking and other exotic forms of type checking can be invalidated. For example, KOTLIN has flow-sensitive type checking but restricts it for variables captured by closures.

Example Implementation: Other Considerations

In order to reduce the need to mark-up code with existent types, it is helpful to provide considerations for primitive types and other types with default values. For example:

int[ ] arr=[1,2,3];

int x=arr[0]??0;

This code can become redundant. Instead, in various embodiments, it is possible to add a type checker rule where a primitive existent type (e.g. int+) can be passed or assigned to another primitive type, provided other type restrictions are satisfied. (For example, a 32-bit signed integer usually cannot be assigned to an 8-bit unsigned integer without explicit casting or conversion.)

Thus, in the sample code above, the types are 'int+' and 'int'. Since the underlying type of the existent type is a primitive type ('int') and 'int' can be assigned to 'int', it is possible add a type checker rule so that int+ can be assigned to int. This allows the sample code to be simplified to:

int[ ] arr=[1,2,3];

int x=arr[0];

If the accessed element is out-of-bounds (using the bounds checking method) or an 'undefined'/out-of-bounds value (using the value checking method), the code generator can handle this case by using either the bounds-checking or value-checking code generation methods and the default value for the underlying data type. Example generated code is as follows:

Bounds Checking

```
int[ ] arr=[1,2,3];

int x=0<arr.length?arr[0]:0;
```

Value Checking

```
int[ ] arr=[1,2,3];

int x=arr[0]!=undefined?arr[0]:0;
```

Furthermore, in various embodiments, it may be desirable to be able to operate on container elements without first converting from an existent type. Thus:

```
int[ ] arr = [ 1, 2, 3 ];
for (int i = 0; i < arr.length; ++i) {
    int+ element = arr[i];
    int element_safe = element ?? 0;
    element_safe++;
}
```

We can express the above code as:

```
int[ ] arr = [ 1, 2, 3 ];
for (int i = 0; i < arr.length; ++i) {
    arr[i]++;
}
```

In order to allow the simpler code, the code might be generated as the following non-limited example with only a single step of de-sugaring:

```
int[ ] arr = [ 1, 2, 3 ];
for (int i = 0; i < arr.length; ++i) {
    if (arr[i] !== undefined) {
        arr[i]++;
    }
}
```

The above example uses the value checking code generation method, but the bounds checking method can also be used. If the attempted operation is operating on data of an existent type, code can be generated so that if the value is within bounds, the operation will occur. However, if the value is out-of-bounds or does not exist, the 'undefined' value can be returned (or another value representing an out-of-bounds access). This may be illustrated using the following non-limiting example assuming zero-based indexes:

```
int[ ] nums = [1, 2, 3];
++nums[0]; // will increment
++nums[3]; // effectively won't do anything
```

The generated code, using the bounds-checking method, may look like:

```
int[ ] nums = [1, 2, 3];
0 < nums.length ? ++nums[0] : undefined;   // will increment
3 < nums.length ? ++nums[3] : undefined;   // evaluates to
'undefined', but effectively won't do anything
```

Furthermore, this can be applied to compound assignment operators such as +=. Thus, the following code (again, assuming zero-based indexes):

```
int[ ] nums = [1, 2, 3];
nums[0] += 1; // will increment
nums[3] += 1; // effectively won't do anything
``` can be generated as:

```
int[ ] nums = [1, 2, 3];
0 < nums.length ? nums[0] += 1 : undefined;   // will increment
3 < nums.length ? nums[3] += 1 : undefined;   // evaluates
to 'undefined', but effectively won't do anything
```

The following can illustrate the type checker implementation in this process:

```
int[ ] nums = [1, 2, 3];
int n3 = ++nums[3]; // Compile-time error, int+ is expected
int+ n3 = ++nums[3]; // OK
```

It should be noted that 'undefined' is a non-limiting concept. Any runtime value that represents an "out-of-bounds" error (whether called 'undefined', 'OutOfBounds', 'OutOfRange', 'OutOfBoundsError', or any possible name representing the same concept) is within the scope of our invention. Unlike exceptions, 'undefined' should not terminate the program if uncaught. It is simply a "value" like 1, 2, 3, "string abc def", true, false, and so on.

Since "undefined" is a value, it can also be inspected. For example, comparison operators can be used to check for the "undefined" value, and a user can optionally decide to log the error. A user may not be interested in all out-of-bounds occurrences, and the "undefined" value enables a user to only inspect the out-of-bounds accesses of interest.

Based on the embodiments herein, the following expressions should evaluate to 'undefined' for out-of-bounds accesses or the requested element/evaluated value for within-bounds accesses:

1. Assignment expressions (=). Example: a[100]=1;
2. Compound assignment expressions (+=, −=, *=, etc). Example: a[100]+=1;
3. Function call expressions
4. Increment (++) and decrement (−−) expressions. Example: a[100]++(postfix) or ++a[100] (prefix).

In most cases, users don't want to handle an out-of-bounds exception. They might prefer for it to "silently fail" for the few corner cases and continue letting the application run. With the approach outlined here, they aren't getting a "silent error." Rather, it is an error value (undefined) that they can inspect at runtime, during debugging, or even in production to log/handle error cases only when/if they are interested. The following example illustrates the same:

```
int[ ] arr = [ 1, 2, 3 ];
int+ x = arr[Math.random(1, 100)];
if (x != undefined) {
    Console.log("Success!"); }
else {
    Console.error("Failure: out-of-bounds access on 'x'");
}
continueRunningRegardless( );
```

Thus, since expressions evaluate to 'undefined' on failure, it allows developers to inspect, whether an error occurred without having the application terminate. Furthermore, a sound static type system will prevent the 'undefined' error value from propagating (e.g. to other variables that were not declared with existent types) at runtime.

Figure 9:
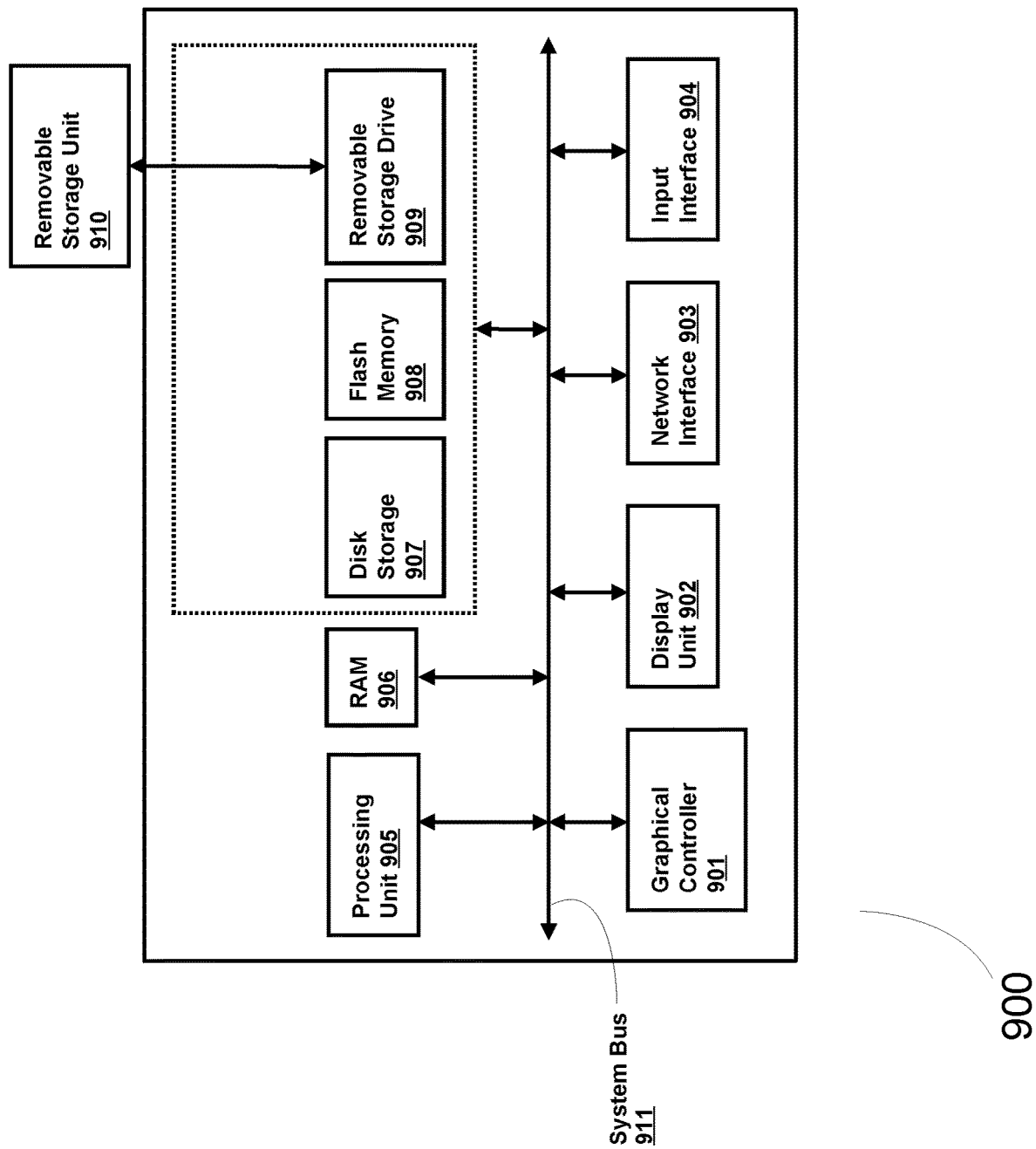
FIG. 9 illustrates an example computing environment for enabling embodiments herein.

FIG. 9 illustrates a computing environment for enabling embodiments herein. A computing device in the form of a computer 900 is described. Computer 900 may include a processing unit 905, a graphical controller (901) for graphic processing, various system memory units 906/907/908/909/910, input interface 904, network interface 903, display unit 902, and a system bus 911.

The processing unit 905 can be any of various available processors. Dual microprocessors and other multiprocessor architectures also can be employed as the processing unit 905.

The system memory may include volatile memory and nonvolatile memory. Nonvolatile memory can include read only memory (ROM), programmable ROM (PROM), electrically programmable ROM (EPROM) or flash memory. Volatile memory may include random access memory (RAM) 906 which may act as external cache memory. The system bus 911 couples system physical artifacts including the system memory to the processing unit 905. The system bus 911 can be any of several types including a memory bus, memory controller, peripheral bus, external bus, or local bus and may use any variety of available bus architectures.

Computer 900 typically includes a variety of computer readable media such as volatile and nonvolatile media, removable and non-removable media. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired data and which can be accessed by computer 900.

It will be appreciated that the functions of the computer 900 can be enabled by software that can act as an intermediary between users and computer resources. This software may include an operating system which can be stored on disk storage 907, and which can control and allocate resources of the computer system 900. Disk storage 907 may be a hard disk drive connected to the system bus 911 through a removable or a non-removable memory interface.

Users of the computer can enter commands or data into the computer 900 through input and output device(s) connected to the input interface 904. Input devices may include but are not limited to a pointing device such as a mouse, trackball, stylus, touch pad, keyboard, microphone, and the like. These and other input devices connect to the processing unit 905 through the system bus 911. Output devices may include but are not limited to video and audio devices. The display device 902 may be connected to the computer 900 through the input interface 904.

Computer 900 can operate in a networked environment using connections to one or more remote computers. Network interface 903 encompasses communication networks such as local area networks (LANs) and wide area networks (WANs) but may also include other networks.

The embodiment disclosed herein specifies a system for eliminating out-of-bounds errors and exceptions in programming languages. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high-speed integrated circuit Hardware Description Language (VHDL) another programming language or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

We claim:

1. A computerized method for eliminating runtime out-of-bounds errors and exceptions, said method comprising:
   receiving input code from a user, where said input code includes at least one variable declaration with an existent type annotation, wherein the existent type annotation includes an identification of an underlying type assigned to the variable, and indicates the type of the declared variable consists of relevant values for the underlying type assigned to the variable, an undefined value, and a null value;
   parsing said input code, said parsing further comprising:
      performing lexical analysis to generate tokens;
      performing syntactical analysis using one or more rules on said generated tokens; and
      generating a parse tree;
   compiling said input code, said compiling further comprising:
      generating an AST from said parse tree;
      performing type checking using one or more rules on said AST, said one or more rules including rules relevant to existent types; and
      programmatically generating output code.

2. The method in claim 1, said type checking method further comprising:
   identifying a container type;
   determining the type declared for elements of said container type; and
   rejecting said input when a type declared for said elements is an existent type.

3. The method in claim 2, said rejection is one of:
producing an error message for the user;
refusing to proceed to a subsequent step in said method; and
refusing to generate output code.

4. The method in claim 1, said method checking further comprising:
identifying a generic type;
determining the type for one or more arguments of said generic type; and
rejecting said input when a type for said one or more arguments is an existent type.

5. The method in claim 4, said rejection is one of:
producing an error message for the user;
refusing to proceed to a subsequent step in said method; and
refusing to generate output code.

6. The method in claim 1, said one or more rules for type checking includes at least one rule to generate an error when data or an expression of an existent type matches one or more of the following conditions:
initialized to a variable associated with a type that is not an existent type;
assigned to a variable associated with a type that is not an existent type;
passed as an argument to a parameter expecting a type that is not an existent type; and
used in an expression where a type that is not an existent type is expected.

7. The method in claim 1, said method further comprising:
evaluating a nested container element access to an existent type.

8. The method in claim 7, where nesting involves containers of varying types.

9. The method in claim 1, said method further comprising:
returning an existent type for an expression describing a container element access.

10. The method in claim 9, where said container is one of an array, a vector, a map, a hash table, a dictionary, a key-value pair, a multimap, an object, an associative array, a stack and a queue.

11. The method in claim 1, said method further comprising:
evaluating an operation's type to an existent type when an operand is an existent type.

12. The method in claim 11, where said operation is one of an increment operation, a decrement operation, a function call, an assignment operation, and a compound assignment operation.

13. The method in claim 1, said method further comprising:
converting an underlying type of an existent type to primitive data type, when the underlying type of said existent type has primitive type data.

14. The method in claim 13, said conversion is performed implicitly during compilation.

15. The method in claim 13, said conversion is performed explicitly via specifications (e.g. type casting) in said input code.

16. The method in claim 1, said method further comprising:
converting a type for data to an existent type's underlying type, when the existent type's underlying type has a default value for data.

17. The method in claim 16, said conversion is performed implicitly during compilation.

18. The method in claim 16, said conversion is performed explicitly using specifications in said input code.

19. The method in claim 1, where said generated output code is one of:
translated code without existent types;
byte code that can be interpreted by a virtual machine;
a custom intermediate representation; or a native machine level instruction code.

20. The method in claim 1, said generating of code further comprising:
generating code for container access where said code returns relevant data, when said access is within bounds.

21. The method in claim 1, said generating of code further comprising:
generating code for container access where said code returns one of "undefined" or an out-of-bounds value, when said access is out-of-bounds.

22. The method in claim 1, said generating of code further comprising:
inserting a value check for a value representing out-of-bounds access.

23. The method in claim 22, wherein said value is "undefined".

24. The method in claim 1, said generating of code further comprising:
inserting a value check for a value representing out-of-bounds access and returning relevant data when access is a within-bounds access.

25. The method in claim 1, said generating of code further comprising:
generating a value representing "undefined" value or out-of-bounds access value, where "undefined" value or out-of-bounds access value is distinct from "null" value.

26. The method in claim 1, said generating of code further comprising:
inserting a bounds check for container access and returning relevant data, when access is a within-bounds access, and returning "undefined", when access is an out-of-bounds access.

27. The method in claim 26, where bounds check is one of a conditional operator check and a conditional jump.

28. The method in claim 1, said type checking method further comprising:
inserting a container-level definition to return existent type for container element access operation.

29. The method in claim 1, said generating of code further comprising:
Inserting a bounds check for container access using container-level implementation, where return data is one of an actual value at an index specified or "undefined".

30. The method in claim 1, said generating of code further comprising:
generating a memory address to represent "undefined" value or out-of-bounds access value, where "undefined" value or out-of-bounds access value is distinct from "null" value.

31. The method in claim 1, said generating of code further comprising:
generating code to check each level of nesting for "undefined" or out-of-bounds access for access code involving nested containers.

32. The method in claim 31, where said nested containers include more than one type of container.

33. The method in claim 1, said generating of code further comprising:
    generating code to perform "no operation" when out-of-bounds access is detected on an operand with existent type.

34. The method in claim 1, said generating of code further comprising: generating code to return "undefined" for an operation when the value of an operand is an existent type or is "undefined".

35. The method in claim 1, said generating of code further comprising:
    generating code to return a default value of an underlying type for data with an existent type, when said underlying type has an associated default value and data access is out-of-bounds.

36. The method in claim 1, said generating of code further comprising:
    generating code to check for "undefined," when the left-hand side of a null assignment operator is an existent type.

37. The method in claim 36, said generating of code further comprising:
    generating code to additionally check for "null" value.

38. The method in claim 1, said generating of code further comprising:
    generating code to check for "undefined," when the left-hand side of a null coalescing operator is an existent type.

39. The method in claim 38, said generating of code further comprising:
    generating code to additionally check for "null" value.

40. The method in claim 1, said generating of code further comprising:
    generating code to check for "undefined," when an object of safe navigation operator is an existent type.

41. The method in claim 40, said generating of code further comprising:
    generating code to additionally check for "null" value.

42. The method in claim 1, said syntactical analysis further comprising:
    continuing to generate the AST when a base type precedes a container type syntax, which precedes the existent type syntax.

43. The method in claim 1, said syntactical analysis further comprising:
    continuing to generate the AST when a base type precedes a container type syntax, which precedes the existent type syntax.

44. The method in claim 1, said syntactical analysis further comprising:
    rejecting input code when a base type precedes an existent type syntax, which precedes a container type syntax.

45. The method in claim 1, said syntactical analysis further comprising:
    continuing to generate the AST when a base type precedes a nullable type syntax, which precedes the existent type syntax.

46. The method in claim 45, where a type annotation generated in the AST is a "supertype" that represents all possible values of said base type plus "null" and "undefined".

47. The method in claim 1, said syntactical analysis further comprising:
    continuing to generate the AST when a base type precedes the existent type syntax, which precedes a nullable type syntax.

48. The method in claim 47, where a type annotation generated in the AST is a "supertype" that represents all possible values of said base type plus "null", and "undefined".

49. The method in claim 1, said syntactical analysis further comprising:
    rejecting input code when a base type precedes a nullable type syntax, which precedes the existent type syntax, which precedes a container type syntax.

50. The method in claim 1, said syntactical analysis further comprising:
    rejecting input code when a base type precedes the existent type syntax, which precedes a nullable type syntax, which precedes a container type syntax.

51. The method in claim 1, said syntactical analysis further comprising:
    rejecting input code when a base type precedes a container type syntax, which precedes the existent type syntax, which precedes a container type syntax.

52. The method in claim 1, said syntactical analysis further comprising:
    rejecting input code when a base type precedes a container type syntax, which precedes a nullable plus existent type syntax, which precedes a container type syntax.

53. The method in claim 1, said syntactical analysis further comprising:
    rejecting input code when a type argument for parametric polymorphism is an existent type.

54. The method in claim 1, said syntactical analysis further comprising:
    rejecting input code when a type argument for parametric polymorphism is a nullable plus existent type.

55. The method in claim 1, said syntactical analysis further comprising:
    rejecting input code based on one or more rules, said rejection includes one or more of the following actions:
    terminate parsing;
    generate an error and immediately report to the user;
    insert an error node into the AST; and
    generate an error to be reported in subsequent stages.

* * * * *